April 21, 1942.     R. A. GARLING     2,280,399
BUFFING WHEEL
Filed Nov. 20, 1940     2 Sheets-Sheet 1
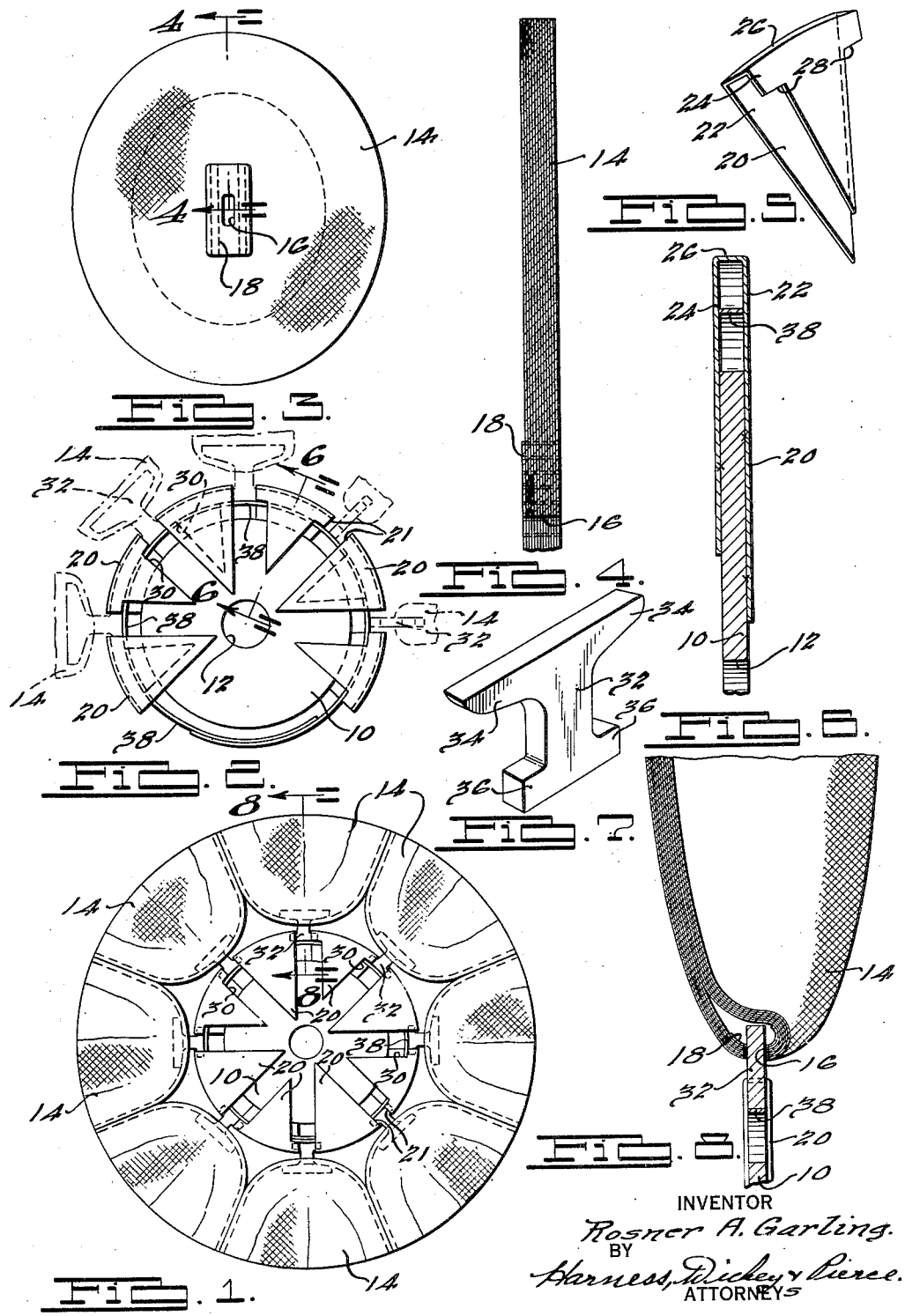
INVENTOR
Rosner A. Garling.

April 21, 1942.    R. A. GARLING    2,280,399
BUFFING WHEEL
Filed Nov. 20, 1940    2 Sheets-Sheet 2

INVENTOR
Rosner A. Garling.
BY
Harness, Dickey & Pierce.
ATTORNEYS.

Patented Apr. 21, 1942

2,280,399

UNITED STATES PATENT OFFICE 2,280,399

BUFFING WHEEL

Rosner A. Garling, Lansing, Mich., assignor to Bruce Products Corporation, Detroit, Mich., a corporation of Michigan Application November 20, 1940, Serial No. 366,325

10 Claims. (Cl. 51—193)

The present invention relates to improved buffing wheels and particularly relates to flexible buffing wheel constructions in which flexible buffing elements are removably attached to a central mounting means.

One of the primary objects of the present invention is to provide improved and simplified manner of removably attaching buffing elements to the periphery of a central holding member in which such elements may be more readily and economically attached and removed than in prior constructions.

Another object of the invention is to provide improved and simplified mountings or supports for removable buffing sections.

Another object of the invention is to provide improved constructions in which used or worn buffing wheel sections may be easily replaced, and when in place are securely mounted so that such sections will not accidentally be dislodged when subjected to the effect of the forces of rotation.

Other objects of the invention will become apparent from the following specification, the drawings relating thereto, and from the claims hereinafter set forth.

In the drawings, in which like numerals are used to designate like parts in the several views throughout:

Figure 1 is a side elevational view of a buffing wheel construction embodying features of the present invention;

Fig. 2 is a partial similar view partially illustrating the buffing sections and one of the attaching elements in dotted lines;

Fig. 3 is an elevational view of an unfolded buffing section;

Fig. 4 is an enlarged cross-sectional view taken substantially along the line 4—4 of Fig. 3;

Fig. 5 is a perspective view of one of the holding elements;

Fig. 6 is an enlarged cross-sectional view taken substantially along the line 6—6 of Fig. 2;

Fig. 7 is a perspective view of an attaching element according to the present invention;

Fig. 8 is an enlarged cross-sectional view taken substantially along the line 8—8 of Fig. 1;

Figure 9:
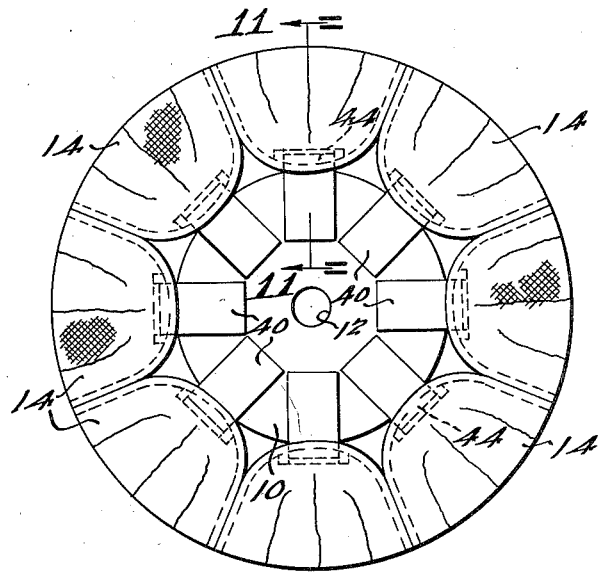
Fig. 9 is a side elevational view of another form of a buffing wheel embodying features of the present invention.

Referring to the drawings, and referring particularly to one of the embodiments illustrated in Figs. 1 through 8, one section of the composite buffing wheel is illustrated in Figs. 1 and 2, and comprises a central metal disc member 10, having a central opening 12 therethrough for the reception of an arbor or other driving means. The discs may be suitably fixed to the arbor for rotation therewith.

A plurality of buffing sections 14 are disposed about the periphery of the disc and are removably attached thereto. As shown in Figs. 3 and 4, such sections 14 are formed of any desired number of thicknesses of fabric material, such as cotton cloth, which are superimposed upon one another and suitably attached together. In the embodiment illustrated, such section is oval in shape, but may have other shapes within the scope of the present invention. Each section is provided with a central opening 16 therethrough, which is surrounded by a re-enforcing member 18, formed of a relatively strong material, such as canvas. The layers of fabric are stitched together in a suitable manner, such as by stitching through all of the layers and through the re-enforcing member 18 around opening 16.

A plurality of holding members 20 are provided which are fixedly mounted to the disc 10 at spaced intervals about the periphery thereof to provide a radially extending space 21 between adjacent members 20. Such members 20 are in the form of sheet metal stampings having side walls 22 and 24, joined by an end peripheral wall 26. One of the side walls has opposite edge portions thereof removed to provide recesses 28 on opposite edges of one of the side walls. The members 20 are so positioned on the disc 10, and are fixed therethrough such as by welding, so that the peripheral wall 26 is disposed outwardly from the periphery of the disc 10 to provide a channel space therebetween. The outer walls 22 and 24 also extend outwardly of disc 10. The members 20 are alternately positioned so that the notches 28 for successive members 20 are on alternate opposite sides of such members around the disc. The members 20 are so positioned that the recesses 28 provide notches on opposite sides of the members 20 for each of the adjacent edges of the adjacent members 20.

In order to mount the buffing sections 14 to the holding members 20, a plurality of holding members 32, one for each of the sections 14, are provided. Such members 32 are generally I-shaped to provide a top having oppositely projecting side portions 34 and a bottom having oppositely projecting side portions 36. The projections 36 extend substantially the length of opening 17 and are shorter than projections 34 so that one of the members 32 is first applied to one of the sections 14 by passing the projections 36 through the opening 16 to such an extent that projections 34 bear against member 18.

Each of such members 32 is then mounted to the disc 10 by positioning the central portion thereof in the radially extending space 21 between a pair of adjacent members 20, and the member 20 is then turned so that the end projections 36 pass through notches 30 formed by recesses 28 in the adjacent edges of the adjacent members 20 on opposite sides thereof. When the member 32 is turned, it will be seen that the projections 36 project within the channels formed by adjacent members 20 outwardly of the periphery of disc 10.

A flat, circular leaf spring 38 having its free ends overlapping, is disposed about the disc 10 and is normally spaced outwardly therefrom within the channels formed by member 20 therewith. The members 32 are positioned by forcing them inwardly against the action of the spring 38; and it will be seen that the spring 38 acts to resiliently urge the members 32 outwardly, so that the projections 36 bear against the end walls 26 of adjacent members 20.

The sections may be successively applied to the mounting disc, and when applied it is preferable that such sections be folded at least once upon the diameter thereof. The ends of the sections are then bunched together, so that the peripheral edges thereof follow irregular paths transversely of the peripheral edges of the wheel.

To remove any or all of the sections, it is merely necessary to force the member 32 radially inwardly against the action of spring 38 and turn such member so that the projections 36 may pass through notches 30. The fabric 14 may then be changed and new sections applied.

It will be evident that an entire composite wheel may be built up by using a plurality of such sections, such as that described above, to obtain a wheel of desired thickness. The sections of such wheel may be suitably held together on the drive arbor by end plates or the like, so that all of such sections form a unitary composite buffing wheel. It will be appreciated by those skilled in the art that in the use of the wheel of the present invention, the wheel is rotated at relatively high speeds and in order to buff or polish an article a buffing composition is applied to the peripheral edge of the wheel and the article then held thereagainst.

Figure 10:
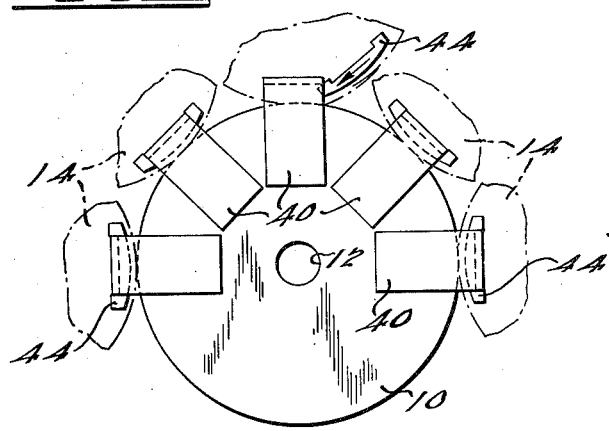
Fig. 10 is a partial side elevational view showing the buffing sections in broken lines and diagrammatically illustrating the manner in which such sections are mounted.
Figure 11:
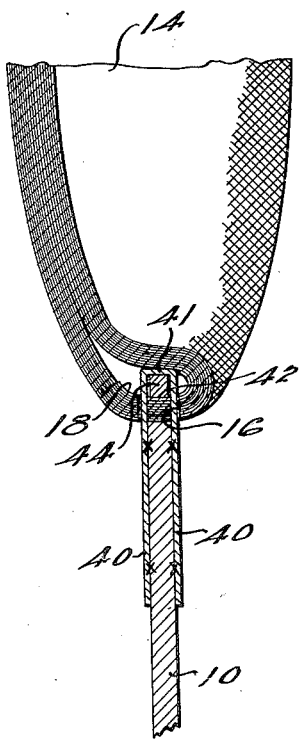
Fig. 11 is an enlarged cross-sectional view taken substantially along the line 11—11 of Fig. 9.
Figure 12:
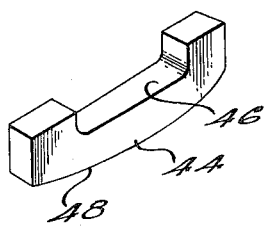
Fig. 12 is a perspective view of one of the removable attaching elements.

Referring to Figs. 9 through 12, a modified form of the present invention is illustrated, in which the same numerals are used to indicate those parts corresponding to the parts in the above described embodiment. The buffing elements 14 and the disc 10 are the same as described above and such buffing elements are disposed in the same arrangement around the disc. A different means for attaching the buffing elements to the disc are, however, provided. Such means include a plurality of metal strap members 40, which are generally rectangular in form and which are bent into a U shape, so that the sides thereof bear against opposite sides of the disc 10 and the end 41 thereof is outwardly spaced from the periphery of the disc 10, as best shown in Fig. 11. Channel spaces 42 are thus provided between the periphery of the disc and the inside surfaces of the ends 40.

The ends 40 are of substantially the same size and shape as the opening 16 through the buffing sections 14, so that the buffing sections are positioned on the disc by passing the outwardly projecting ends of the members 40 through the opening 16. The buffing sections 14 are forced inwardly, so that that portion around the opening 16 bears against the periphery of the disc and a space is thus provided between the outer surface of the elements 14 around the opening 16, and the inner surface of the ends 40. The buffing sections are slightly resilient due to the compactability of the lamination of the fabric, which makes up the sections.

In order to secure the members 14 onto the members 40, a securing element 44 is provided for each of the buffing sections. Such element 44 is formed with a recess 46 along one edge thereof and preferably a curving opposite edge 48. The recess is of substantially the width of members 40 and the central thickness of the members 44 is preferably slightly greater than the normal distance between the buffing sections and the inside of ends 40.

It will thus be appreciated that the elements 44 may be positioned by sliding such elements into the channels 42 in the space, as shown in Fig. 10. The fabric may be slightly compressed to permit such entrance and such resiliency will then force the member 44 outwardly. The end 41 is thus received within the recess 46 with the adjacent shoulders of the recess abutting against the side edges thereof, so that the members 44 cannot become accidentally displaced.

It will be appreciated that the above described construction is relatively simple and that it is an easy matter to remove and replace the buffing sections, merely by removing the elements 44 and pulling the buffing sections off from the ends of members 40.

Formal changes may be made in the specific embodiment of the invention described without departing from the spirit and substance of the invention, the scope of which is commensurate with the appended claims.

What is claimed is:

1. A buffing wheel comprising a central disc adapted to be mounted on a shaft for rotation therewith, a plurality of holding members secured to said disc adjacent the periphery thereof and spaced therearound, said members having peripheral portions spaced outwardly from and overlying the periphery of said disc to provide channels therebetween, a plurality of centrally apertured buffing elements disposed about the periphery of said disc, and means attaching said elements to said members, said means having portions which engage said elements through said apertures and having other portions which engage said members within said channels.

2. A buffing wheel comprising a central disc adapted to be mounted on a shaft for rotation therewith, a plurality of holding members secured to said disc adjacent the periphery thereof and spaced therearound, said members having peripheral portions spaced outwardly from and overlying the periphery of said disc to provide channels therebetween, a plurality of centrally apertured buffing elements disposed about the periphery of said disc, and means attaching said elements to said members, said means having portions which engage said elements through said apertures and having other portions which separably engage said members within said channels.

3. A buffing wheel comprising a central disc adapted to be mounted on a shaft for rotation therewith, a plurality of holding members secured to said disc adjacent the periphery thereof, said holding members being spaced with respect to the disc and with respect to each other to provide a radial space between adjacent members and to provide channels between the periphery of said disc and the periphery of said members, a plurality of centrally apertured buffing elements disposed about the periphery of said disc, and individual members for removably attaching said elements to said holding members, each of said individual members having a portion which extends through the aperture of one of said elements and engages portions of said element adjacent said aperture, each of said elements extending within one of the spaces between adjacent holding members and having portions which project in opposite directions within the channels of adjacent holding members.

4. A buffing wheel comprising a central disc adapted to be mounted on a shaft for rotation therewith, a plurality of holding members secured to said disc adjacent the periphery thereof, said holding members being spaced with respect to the disc and with respect to each other to provide a radially extending space between adjacent members and to provide channels between the periphery of said disc and the periphery of said members, a plurality of centrally apertured buffing elements disposed about the periphery of said disc, and individual members for removably attaching said elements to said holding members, each of said individual members generally I-shaped, one end of each of said individual members extending through the aperture of one of said elements adjacent the walls of said aperture, each of said individual members being disposed within the space between the adjacent holding members and the other end of each of said individual members extending within the channels of adjacent holding members.

5. A buffing wheel comprising a central disc adapted to be mounted on a shaft for rotation therewith, a plurality of holding members secured to said disc adjacent the periphery thereof, said holding members being spaced with respect to the disc and with respect to each other to provide a radially extending space between adjacent members and to provide channels between the periphery of said disc and the periphery of said members, a plurality of centrally apertured buffing elements disposed about the periphery of said disc, individual members for removably attaching said elements to said holding members, each of said individual members having a portion which extends through the aperture of one of said elements and engages portions of said element adjacent said aperture, each of said elements extending within one of the spaces between adjacent holding members and having portions which project in opposite directions within the channels of adjacent holding members, and resilient means disposed within said channels and urging said individual members outwardly therein.

6. A buffing wheel comprising a central disc adapted to be mounted on a shaft for rotation therewith, a plurality of holding members secured to said disc adjacent the periphery thereof spaced with respect to each other to provide a radially extending space between adjacent members, said holding members having side walls extending beyond the periphery of said disc and having a peripheral wall overlying the periphery of said disc in spaced relation thereto, thereby providing channels between the periphery of said disc and the periphery of said members, the edges of said side walls on alternately opposite sides of said disc therearound being shaped to provide notches, a plurality of centrally apertured buffing elements disposed about the periphery of said disc and individual members for removably attaching said elements to said holding members each of said individual members being generally I-shaped, one end of each of said individual members extending through the aperture of said members adjacent the walls of said aperture, each of said individual members being disposed within one of the spaces between adjacent holding members and the other end of each of said individual resilient members being turnable through said notches to extend within the channels of said adjacent holding members.

7. A buffing wheel comprising a central disc adapted to be mounted on a shaft for rotation therewith, a plurality of holding members secured to said disc adjacent the periphery thereof and spaced therearound, said holding members extending outwardly beyond the periphery of said disc and providing a channel space between the ends thereof and the periphery of said disc, a plurality of flexible buffing elements disposed about the periphery of said disc, said elements having central openings therethrough and being diametrically folded upon themselves, and separable means attaching said elements to said members, said separable means being so constructed as to engage said elements and to engage said members within said channels.

8. A buffing wheel comprising a central disc adapted to be mounted on a shaft for rotation therewith, a plurality of holding members secured to said disc adjacent the periphery thereof and spaced therearound, said holding members straddling the sides of said disc with the ends of said holding members disposed outwardly from the periphery of said disc to provide channels therebetween, a plurality of flexible buffing elements disposed about the periphery of said disc, said elements having central openings therethrough, and separable means attaching said elements to said members, said separable means being so constructed and arranged as to be movable into said channels and in engagement with said members and to engage said elements adjacent said openings.

9. A buffing wheel comprising a central disc adapted to be mounted on a shaft for rotation therewith, a plurality of holding members secured to said disc adjacent the periphery thereof and spaced therearound, said holding members engaging the opposite sides of said disc with the ends thereof extending outwardly thereon of the periphery of said disc to provide a channel between the ends and said periphery, a plurality of flexible buffing elements disposed about said elements having central openings therethrough and being positioned so that said members extend through said central openings and extend outwardly therebeyond, and means attaching said elements to said members, said last named means including elements which are slidable into the channel space between the buffing elements and the ends of said members to bear against said elements and to bear against said members to thereby secure said elements to said members.

10. A buffing wheel comprising a central disc adapted to be mounted on a shaft for rotation therewith, a plurality of holding members secured to said disc adjacent the periphery thereof and spaced therearound, said holding members engaging the opposite sides of said disc with the ends thereof extending outwardly thereon of the periphery of said disc to provide a channel between the ends and said periphery, a plurality of flexible buffing elements disposed about said elements having central openings therethrough and being positioned so that said members extend through said central openings and extend outwardly therebeyond, and means attaching said elements to said members, said last named means including members provided with a shoulder recess on one edge thereof, so that said members are slidable into the space between said buffing elements and the ends of said members, with said recess cooperating with said members to releasably lock said last named elements in position with the opposite side thereof bearing against said buffing elements.

ROSNER A. GARLING.

CERTIFICATE OF CORRECTION.

Patent No. 2,280,399.  April 21, 1942.

ROSNER A. GARLING.

It is hereby certified that error appears in the printed specification of the above numbered patent requiring correction as follows: Page 3, first column, line 43, claim 4, before "generally" insert --being--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.